United States Patent [19]

Strandine et al.

[11] B 4,008,338
[45] Feb. 15, 1977

[54] METHOD FOR INJECTING A LIQUID ADDITIVE INTO POULTRY FLESH WITHOUT PENETRATING THE SKIN

[75] Inventors: Eldon J. Strandine, Chicago; Carl H. Koonz, Northbrook, both of Ill.

[73] Assignee: Swift and Company, Limited, Chicago, Ill.

[22] Filed: Aug. 1, 1974

[21] Appl. No.: 493,686

[44] Published under the second Trial Voluntary Protest Program on March 23, 1976 as document No. B 493,686.

[52] U.S. Cl. .............................. 426/281; 27/24 R; 99/532; 128/215
[51] Int. Cl.² ........................................ A23L 1/315
[58] Field of Search ............ 426/224, 281; 99/532, 99/533; 120/215, 347; 17/42.1; 27/24 R

[56] References Cited

UNITED STATES PATENTS

| | | |
|---|---|---|
| 3,511,164 | 5/1970 | Strandine et al. .................. 99/532 |
| 3,682,087 | 8/1972 | Panek ............................. 128/347 X |
| 3,835,223 | 9/1974 | Schwall et al. ................ 426/281 X |

*Primary Examiner*—S. Leon Bashore
*Assistant Examiner*—M. Steven Alvo
*Attorney, Agent, or Firm*—Edward T. McCabe; Charles E. Bouton; W. C. Davis

[57] ABSTRACT

A method for injecting an additive material into the flesh of a poultry carcass by inserting a comb-like instrument comprising a hollow manifold and a plurality of hollow tines extending therefrom, longitudinally of a poultry carcass between the skin and flesh, thereof, and the tines are forced into the flesh without penetrating the skin. Thereafter, a liquid additive is forced through the manifold and tines and through orifices therein and ejected into the flesh.

4 Claims, 1 Drawing Figure

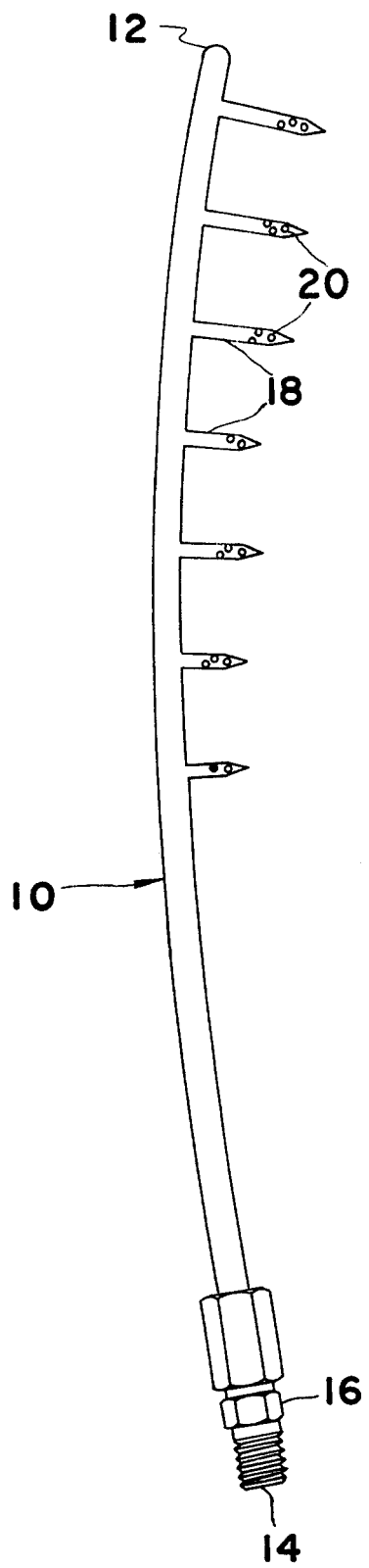

METHOD FOR INJECTING A LIQUID ADDITIVE INTO POULTRY FLESH WITHOUT PENETRATING THE SKIN

This invention relates to an improved method for improving the eating qualities of poultry; and more specifically relates to an improved method for injecting a treating agent or additive into the breast tissue of the poultry carcass.

There are numerous examples of prior art teaching the benefication of meat and poultry by the injection of various additives therein. Aqueous and fat based additives have been described. Various techniques for injecting such materials have also been disclosed. With particular regard to the injection of poultry flesh, two recent patents illustrate somewhat different approaches. According to the Schwall et al U.S. Pat. No. 3,366,491, a liquid fat is injected into poultry in such a way as to purposely exude therefrom during cooking. In essence, the liquid fat is injected through needles that penetrate both the skin and the flesh so as to leave passageways for the injected material to escape onto the surface of the carcass. According to the Strandine et al U.S. Pat. No. 3,556,809, it is beneficial to retain as much as possible of an additive material in the poultry flesh; and accordingly an injection needle, or the like, is carefully inserted from points on the flesh exposed at either the anterior or posterior eviscerating incisions so as to leave the skin intact and to minimize or eliminate passageways by which the additive could escape from the flesh. It is notable that Schwall et al indicates that at least some of the benefits of basting the skin of the carcass may be obtained where the injected material exudes, during cooking, to between the skin and flesh; and to effect this the skin is displaced, during injection, so that the holes therein will not be aligned with the passageways left in the flesh, and thereby apparently delay or reduce the amount of material exuded onto the outer surface of the skin.

Injection techniques involving actual penetration of the poultry skin at a multiplicity of points is believed undesirable for additional reasons. Each opening in the skin represents a potential exit point for the injected material immediately after it is distributed in the flesh and before it has an opportunity to either congeal, gel, or otherwise be held by the flesh toward subsequent cooking. Additionally, each opening in the skin represents a potential entry point for microorganisms to enter into the flesh or at least beneath the skin where the cook cannot flush or wash them away during preparatory cleaning operations, and where such microorganisms may find a favorable environment for growth during storage and cooking.

Accordingly, it is believed that it would be an advantageous advance in the art to devise a method and apparatus for injecting an additive material into poultry flesh in a manner leaving passageways to the inner surface of the skin but without penetrating same.

Accordingly, it is a principal object of the present invention to provide an improved method and apparatus for injecting an additive material into the flesh of a poultry carcass.

It is another object of the present invention to provide an improved method and apparatus for injecting additive material into the breast tissue of a poultry carcass without penetrating the skin thereon.

It is still another object of the present invention to provide an improved method and apparatus for injecting an additive into the breast tissue of a poultry carcass from points between the skin and the surface of the flesh.

Briefly stated, the present invention involves the insertion of a comb-like instrument between the skin and flesh of a poultry carcass and penetrating certain portions thereof into the flesh. The comb-like instrument is inserted longitudinally of the carcass from either the anterior or posterior end by lifting the skin away from the flesh and holding the instrument sideways so that the tines are parallel with the flesh surface. When fully extended the instrument is turned or rotated so as to aim the tines into the flesh, and the tines are pushed into the flesh and the additive is inserted therethrough.

The apparatus is basically comb-like in shape and comprises a hollow manifold with a plurality of hollow tines extending therefrom. The tines are pointed and have orifices in the body thereof.

Further objects and advantages will become apparent upon reading the following detailed specification in conjunction with the drawing wherein:

The single FIGURE is a side view of a preferred embodiment of the injection apparatus of this invention.

The present invention contemplates the injection of any additive, be it aqueous, oil, or other, into the breast tissue of a poultry carcass. The injection operation is preferably conducted after the poultry carcass has been processed through evisceration and cleaning procedures. Such procedures leave the carcass with openings cut at the anterior (crop) and the posterior (stern) and empty body cavities at each end. Preferably, the injection operation is undertaken only after the carcass has also at least been partially chilled, as at this point during processing the flesh is cool and will better retain injected materials against escape; and the carcass thereafter is not exposed to any substantial degree of tumbling or rough handling or the like which might tend to expel injected materials.

It is also preferred that the injection operation be undertaken before the legs are trussed or tied; and before the carcass has become rigid due to rigor mortis. In this condition the legs of the bird may be moved and flexed with ease so as to permit access for injection. The carcass must also, of course, be unfrozen.

In the unfrozen condition it will be found that the skin of a poultry carcass is extremely elastic and flexible. Indeed, one may force his hand between the skin and breast tissue at either end of the carcass. Accordingly, it is intended to take advantage of this characteristic to attain access to the breast tissue of a carcass throughout substantially the length thereof. To this end, a comb-like injection instrument having a hollow manifold and a plurality of hollow tines, hereinafter described in greater detail, is inserted substantially the length of the carcass between the skin and flesh. The instrument is first inserted with the tines held substantially parallel to the surface of the flesh. It is possible to insert such an instrument from either the anterior or posterior openings where the skin is already cut open and the ends of the breast tissue are exposed. However, it is preferred to insert the instrument from the posterior end because the natural curve of the body is minimal and grandual, whereas at the anterior end the body curves abruptly making it difficult to extend a rigid instrument for a significant distance.

When the instrument has been inserted fully lengthwise, it is then drawn slightly away from the carcass, thereby stretching the skin, and the instrument is turned or rotated approximately 90° so as to aim the tines directly into the flesh. That is, the tines will be at a sharp angle of up to about 90° to the surface of the breast tissue. Thereafter, the tines are penetrated into the flesh, preferably to their full depth. This may be accomplished by an operator pressing against the carcass skin directly onto the manifold member until the tines are fully inserted and the manifold rests along the surface of the flesh. The foregoing operation may be facilitated by resting the pointed ends of the tines against the flesh, after the instrument is fully inserted between the skin and flesh, and then swinging the manifold outwardly of the carcass while the points of the tines begin to penetrate the flesh thereof.

When the tines are fully penetrated into the flesh the desired amount of liquid additive is delivered through the manifold from a convenient source. Usually the liquid will be delivered under pressure and metered by means well known to the art. Both the aforementioned Schwall et al and Strandine et al patents suggest formulas for additives and ways by which to regulate the amount of such materials. According to the present invention the liquid additive will flow through the manifold and tines and exit through orifices therein into the poultry flesh. After injection is completed the instrument is withdrawn in substantially the reverse order by which it is inserted. That is, the manifold is first lifted outwardly away from the flesh until the tines have been fully withdrawn. Thereafter, the instrument is turned or rotated so as to position the tines substantially parallel to the surface of the flesh; and the instrument is then withdrawn from the posterior (or anterior) end of the bird. Each side of the breast should be injected one or more times in the foregoing manner.

The preferred apparatus for performing the present invention is shown in the drawing. A hollow manifold generally 10 of a length substantially equal to the longitudinal dimension of carcasses in a given weight range to be treated, is provided with a closed blunt end 12 and an opposite open end 14, the latter having mounted thereon a suitable coupling 16 by which it may be connected to a source of additive supply, not shown. Extending from a side of the manifold 10, in an essentially common plane, are a plurality of hollow tines 18. The interior of each tine is in communication with the hollow interior of the manifold 10. These parts are preferably constructed of a rigid material such as stainless steel and may be assembled by welding or brazing the tines over holes drilled in the manifold. It is also possible to construct the device from other metals or from rigid plastic materials, however, stainless steel is preferred because of its durability through use and sanitizing procedures.

The tines 18 are pointed at the ends away from the manifold 10. This, of course, facilitates penetration of the poultry flesh. It is also important that the closed end 12 of manifold 10 be blunt and smooth so as not to tear or penetrate the skin of a poultry carcass. Each tine 18 includes one or more orifices 20 located between the pointed end and the manifold 10 preferably each tine includes a plurality of such orifices 20 evenly spaced around the cylindrical surface of each tine but limited to an area toward the pointed end. Thus, injection of the additive material at locations closely adjacent the surface of the flesh will be avoided and the bulk of the material will be injected deep into the flesh.

It is also preferable to slightly curve the manifold 10 in at least one plane so as to make it adaptable to the body curve of the breast area of a poultry carcass. Where the manifold is thus curved the tines 18 extend from the concave side thereof. Additionally, it is preferred to dimension the tines 18 in accordance with the thickness of the flesh throughout the length of a breast area. The preferred embodiment of apparatus shown in the drawings is devised for insertion between the skin and flesh from the posterior end of the carcass. Hence, the blunt end 12 of the manifold 10 will reach a point adjacent the thicker portions of breast tissue. From that point toward the posterior end of the bird the breast tissue normally diminishes in depth. Accordingly, it is preferred that the tines 18 are of progressively lesser length as they are spaced away from the blunt end 12 of manifold 10. Since the breast tissue becomes very shallow toward the posterior of the carcass it is of little value to inject along the posterior portions. Hence, it is also preferable to space and position the tines 18 along only approximately ⅔ of the length of the manifold 10 measured from the closed end 12.

It will be understood that an instrument designed for insertion from the anterior (crop) end of a carcass would be relatively shorter in length and the tines would be spaced throughout the length thereof with the shorter tines nearer the closed end and the longer tines nearer the open end thereof.

Obviously many modifications and variations of the invention as hereinbefore set forth may be made without departing from the spirit and scope thereof, and, therefore, only such limitations should be imposed as are indicated in the appended claims.

We claim:

1. A method for injecting an additive material into the flesh of a poultry carcass, said method comprising: inserting a comb-like injector instrument between the flesh and the skin by pulling the skin away from the flesh at a point where the skin is cut open from the flesh and advancing said instrument along a portion of the carcass, said injector instrument having a hollow manifold portion and a plurality of hollow tines extending perpendicular thereto in a plane along said manifold, and said instrument being first held with the tines substantially parallel to the surface of said flesh; turning said injector instrument to point said tines into said flesh whereby the skin is stretched from said flesh; embedding said plurality of tines into said flesh without penetrating the skin and until said manifold rests against the surface thereof; and introducing an additive under pressure through said hollow manifold and through said tines and into said flesh while the tines are embedded therein.

2. The method of claim 1 wherein the injector instrument is inserted between the skin and flesh of a poultry breast from a point adjacent the posterior opening of an eviscerated carcass.

3. The method of claim 1 wherein the injector instrument is turned and embedded by placing the end points of said tines against the surface of said flesh, then swinging said manifold outwardly of said flesh, thereby stretching the skin, until the tines are substantially normal to said flesh, and then exerting an inwardly directed force against said skin at points opposite said manifold.

4. The method of claim 1 wherein the injector instrument is withdrawn following introduction of said additive by reversing the steps to extract the tines outwardly of said flesh, turn the tines parallel to said flesh, and withdrawing said instrument from between the flesh and skin without penetrating the skin.

* * * * *

UNITED STATES PATENT OFFICE
CERTIFICATE OF CORRECTION

PATENT NO. : 4,008,338
DATED : February 15, 1977
INVENTOR(S) : ELDON J. STRANDINE and CARL H. KOONZ It is certified that error appears in the above-identified patent and that said Letters Patent are hereby corrected as shown below:

The patent should show on its face that it is assigned to Swift & Company of Chicago, Illinois.

Signed and Sealed this twenty-third Day of August 1977

[SEAL]

Attest:

RUTH C. MASON
Attesting Officer

C. MARSHALL DANN
Commissioner of Patents and Trademarks